(12) United States Patent
Schrock et al.

(10) Patent No.: US 9,015,733 B2
(45) Date of Patent: Apr. 21, 2015

(54) API VERSION TESTING BASED ON QUERY SCHEMA

(75) Inventors: Nicholas Hage Schrock, San Francisco, CA (US); Lee Williams Byron, San Francisco, CA (US); Daniel L. Schafer, Dublin (IE)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/601,815

(22) Filed: Aug. 31, 2012

(65) Prior Publication Data

US 2014/0068639 A1    Mar. 6, 2014

(51) Int. Cl.
| | |
|---|---|
| G06F 3/00 | (2006.01) |
| G06F 9/44 | (2006.01) |
| G06F 9/46 | (2006.01) |
| G06F 13/00 | (2006.01) |
| G06F 9/54 | (2006.01) |
| G06F 11/36 | (2006.01) |

(52) U.S. Cl.
CPC .............. *G06F 9/54* (2013.01); *G06F 11/3668* (2013.01)

(58) Field of Classification Search
None
See application file for complete search history.

(56) References Cited

U.S. PATENT DOCUMENTS

| | | | |
|---|---|---|---|
| 5,201,046 A | 4/1993 | Goldberg | |
| 5,970,496 A | 10/1999 | Katzenberger | |
| 6,377,953 B1 | 4/2002 | Gawlick | |
| 6,571,232 B1 | 5/2003 | Goldberg | |
| 7,359,917 B2 | 4/2008 | Winter | |
| 7,496,912 B2 * | 2/2009 | Keller et al. | 717/174 |
| 7,512,633 B2 | 3/2009 | Cohen | |
| 7,818,759 B2 * | 10/2010 | Ahmed et al. | 719/330 |
| 2005/0183097 A1 | 8/2005 | Carter | |
| 2007/0174304 A1 | 7/2007 | Shrufi | |
| 2008/0016023 A1 | 1/2008 | Aspinall | |
| 2008/0133891 A1 * | 6/2008 | Salz et al. | 712/220 |
| 2008/0250006 A1 | 10/2008 | Dettinger | |
| 2009/0006429 A1 | 1/2009 | Champion | |
| 2009/0024590 A1 | 1/2009 | Sturge | |
| 2009/0063433 A1 | 3/2009 | Nelson | |
| 2009/0287670 A1 | 11/2009 | Hou | |
| 2009/0313270 A1 | 12/2009 | Aust | |
| 2010/0049556 A1 | 2/2010 | Liu | |
| 2010/0153412 A1 | 6/2010 | Mavrov | |
| 2010/0241644 A1 | 9/2010 | Jackson | |
| 2011/0035417 A1 * | 2/2011 | Cohen et al. | 707/803 |
| 2011/0153666 A1 | 6/2011 | Flynn | |
| 2011/0173168 A1 * | 7/2011 | Jones et al. | 707/695 |
| 2011/0314202 A1 | 12/2011 | Iyigun | |
| 2012/0303652 A1 | 11/2012 | Tseng | |

(Continued)

OTHER PUBLICATIONS

U.S. Appl. No. 13/601,666, filed Aug. 31, 2012, Wolchok.
U.S. Appl. No. 13/601,769, filed Aug. 31, 2012, Schrock.

(Continued)

*Primary Examiner* — H S Sough
*Assistant Examiner* — William C Wood
(74) *Attorney, Agent, or Firm* — Baker Botts L.L.P.

(57) ABSTRACT

In one embodiment, a method includes storing one or more first schemas associated with a first version of an Application Programming Interface (API), the API being used for retrieving data items stored in one or more hierarchical graphs, the first schemas comprise one or more definitions of one or more data types to which the data items belong; forming one or more second schemas associated with a second version of the API; and validating the second version of the API by comparing the second query schemas with the first query schemas.

15 Claims, 3 Drawing Sheets

(56) References Cited

U.S. PATENT DOCUMENTS

2014/0067781 A1 3/2014 Wolchok
2014/0067850 A1 3/2014 Schrock

OTHER PUBLICATIONS

International Search Report and Written Opinion for International Application PCT/US2013/056941, Dec. 9, 2013.
Non-Final Rejection for U.S. Appl. No. 13/601,666, Nov. 6, 2014.
Response to Final Rejection for U.S. Appl. No. 13/601,666, Oct. 21, 2014.
Final Rejection for U.S. Appl. No. 13/601,666, Jun. 4, 2014.
Response to Non-Final Rejection for U.S. Appl. No. 13/601,666, Mar. 6, 2014.
Non-Final Rejection for U.S. Appl. No. 13/601,666, Nov. 4, 2013.
Non-Final Rejection for U.S. Appl. No. 13/601,769, Jan. 6, 2015.
International Search Report and Written Opinion for International Application PCT/U52013/056939, Nov. 27, 2013.
International Search Report Opinion for International Application PCT/US2013/056940, Dec. 18, 2013.

* cited by examiner

API VERSION TESTING BASED ON QUERY SCHEMA

TECHNICAL FIELD

This disclosure generally relates to information management, including information storage, retrieval, and processing.

BACKGROUND

Data or information may be organized and stored according to specific formats. Thereafter, specific pieces of stored data or information may be retrieved from storage. The actual means for retrieving the stored data or information may depend on the specific format used for organizing and storing the data or information. For example, if the data is organized and stored according to tabular format (e.g., in a table having columns, rows, and cells), to retrieve specific pieces of data, it may be necessary to identify the specific columns, rows, or cells where the desired pieces of data are stored.

SUMMARY

Particular embodiments, data items may be organized and stored in one or more hierarchical graphs, where each graph may include any number of nodes arranged in a hierarchy. Relationships may exist among specific nodes in a graph, which may reflect the relationships existing among data items represented by the corresponding nodes. Consequently, the structure of a graph may reflect the relationships among the individual data items contained in that graph.

In particular embodiments, an Application Programming Interface (API) may be provided for querying the graphs for the data stored therein and for retrieving specific data items from the graphs. Furthermore, a query for specific data items stored in the graphs may be expressed in a language having a hierarchical structure. The retrieved data items are also organized in a hierarchy structure.

In particular embodiments, the API may have any number of versions. There may be any number of query schemas associated with each version of the API. The query schemas may include various data types available in the graphs and how different types of data may be retrieved from the graph. The query schemas may be used to test and validate different versions of the API.

In particular embodiments, data item stored in the graphs may have various data types. An application may query the API about data types and data structures of data items to be returned from the API.

DESCRIPTION OF EXAMPLE EMBODIMENTS

In particular embodiments, data may be organized and stored in any number of graphs, each having a hierarchical structure. Each graph may include any number of nodes arranged in a hierarchy. That is, there may be any number of levels in a graph, and at each level, there may be any number of nodes. Each node may represent or may be used to store some specific data items. Relationships may exist between specific nodes in a graph, which may reflect relationships between specific data items represented by these corresponding nodes. Consequently, the structure of a graph may reflect the relationships among the individual data items contained in that graph. In particular embodiments, the data items may have various types.

In particular embodiments, an Application Programming Interface (API) may be provided for querying the graphs for the data stored therein and for retrieving specific data items from the graphs. In particular embodiments, a query for specific data items stored in the graphs may be expressed in a language having a hierarchical structure. Thus, the query itself has a hierarchical structure. In particular embodiments, if the desired data items, as specified by the query, are found in the graphs, the data items, or more specifically, the nodes representing or containing these data items, are retrieved from the graphs in response to the query. The retrieved data items are also organized in a hierarchy structure.

In particular embodiments, the API may have any number of versions. As an example, from time to time, the API may be updated from an older version to a newer version. As another example, there may be different versions of the API developed for different platforms (e.g., mobile, desktop, web-based). In particular embodiments, there may be any number of query schemas associated with each version of the API. The query schemas may include various data types available in the graphs and how different types of data may be retrieved from the graph.

In particular embodiments, given a first version of the API that is known to function correctly, a second version of the API may be tested using the query schemas associated with the first and second versions, respectively, to ensure that the second version also functions correctly. The query schemas associated with the second version of the API may be compared against the query schemas associated with the first version to ensure that, for example, all the data types existing in the query schemas associated with the first version also exist in the query schemas associated with the second version, and querying and retrieving various types of data from the graphs using the query schemas associated with the second version yields the same result as using the query schemas associated with the first version.

In particular embodiments, data item stored in the graphs may have various data types. An application may query the API about data types and data structures of data items to be returned from the API. In particular embodiments, an application may generate an introspection query for a specific data type (i.e., a request to examine content or data structure of the specific data type). The application may submit the introspective query to the API and retrieve from the graphs a data structure of the specific data type. The application may construct a data query requesting data items with the specific data type from the graphs based on the data structure retrieved by the introspective query.

Figure 1:
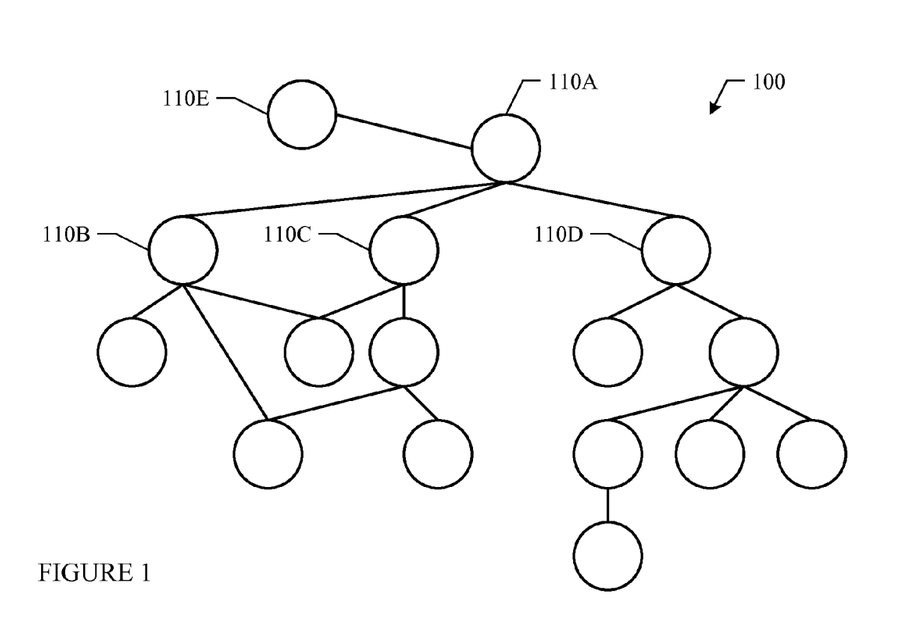
FIG. 1 illustrates an example graph having a hierarchical structure.

FIG. 1 illustrates an example graph 100 having a hierarchical structure. Graph 100 may include any number of nodes arranged in a hierarchy of any number of levels. At each level of the hierarchy, there may be one or more of the nodes. Various types of relationships may exist between specific nodes, which may be reflected in the structure of the hierarchy. For example, a parent-child relationship may exist between two specific nodes. In FIG. 1, node 110A may be the parent of nodes 110B, 110C, and 110D; conversely, nodes 110B, 110C, and 110D may each be a child of node 110A. Note that in general, a node may have any number of children or parents. As another example, a sibling relationship may exist between two specific nodes. In FIG. 1, nodes 110B, 110C, and 110D may be siblings as they share a common parent node 110A. As a third example, a connection may exist between two specific nodes. In FIG. 1, a connection exists between nodes 110A and 110E.

In particular embodiments, data may be organized and stored in a hierarchical graph, such as graph 100. Each node in the graph may represent or contain some specific data items. The structure of the graph reflects the relationships among the nodes and consequently the relationships among the specific data items represented by or contained in these nodes.

In particular embodiments, data or information associated with a social-networking system may be stored in any number of hierarchical graphs. There may be various types of data associated with the social-networking system, and specific data items may be represented by or contained in specific nodes. For example, some of the nodes may represent individual users of the social-networking system. Two of such nodes may be connected if the two corresponding users are "friends" in the social-networking system. Some of the nodes may represent activities (e.g., online or offline) performed by specific users. A node representing a user and a node representing an activity performed by that user may be connected. Furthermore, the node representing the user may be considered the parent of the node representing the activity performed by that user, reflecting the relationship between the user and the activity (i.e., the user performs the activity). Some of the nodes may represent contents (e.g., images, videos, posts, messages, feeds) associated with specific users. A node and its child nodes may represent a photo album and specific photos belonging to that photo album, respectively. In this case, a connection may exist between the node representing the photo album and each node representing an image belonging to that photo album. Another node and its child nodes may represent a user and photo albums uploaded by that user, respectively.

In particular embodiments, graphs containing data (e.g., data associated with a social-networking system) may be stored (e.g., in data stores or memory) so that specific data items may be retrieved from the graphs whenever desirable. In particular embodiments, an API may be provided for querying the graphs for the data stored therein and for retrieving specific data items from the graphs.

Figure 2:
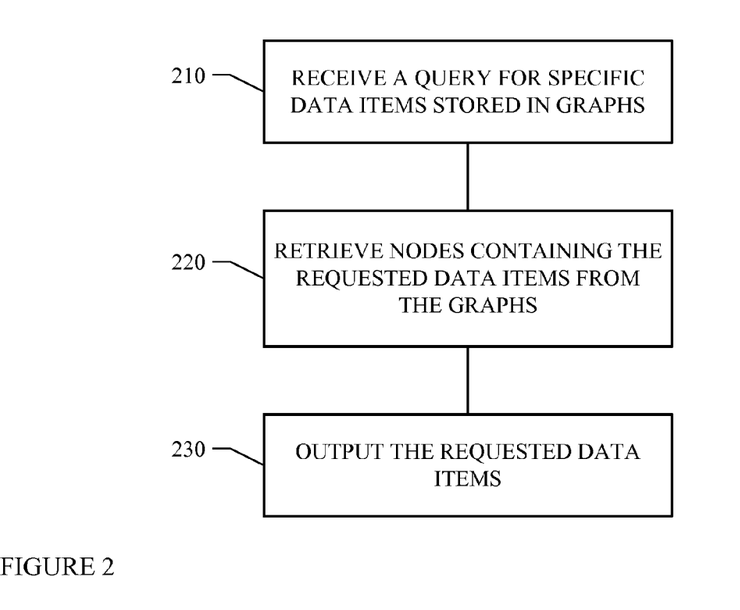
FIG. 2 illustrates an example method for retrieve specific data items from hierarchical graphs.

FIG. 2 illustrates an example method for retrieving specific data items from hierarchical graphs. Suppose that, in particular embodiments, data are stored in hierarchical graphs, where each node in a graph contains or represents one or more specific data items. A user may use the API to query specific data items stored in these hierarchical graphs.

In particular embodiments, the method illustrated in FIG. 2 may start at step 210, where a user may send a query that identifies specific data items to be retrieved from the hierarchical graphs. For example, the query may be sent from a user device (e.g., mobile or non-mobile user device) to a computing system (e.g., server) managing the graphs over appropriate computer or communication connections (e.g., wireless or wireline connections). In particular embodiments, an appropriate API call may be invoked by the user device to send the query to the server.

In particular embodiments, a query may be expressed in a language having a hierarchical structure. Furthermore, in particular embodiments, the language may have a predefined syntax. The following illustrates an example query.

```
me() {
    id,
    name,
    my_objects.first(10) {
        nodes {
            actors {id, name, profile_pic_image},
            message {text, ranges},
            with {id, name, profile_pic_image},
            application {id, name, profile_pic_image},
            explicit_place {id, name, location {latitude, longitude}},
            attachments {
                id,
                image,
                owner,
                message,
                created_time,
                modified_time,
                feedback {
                    like_sentence, likers {count}, comments {count}
                }
            }
        }
    }
}
```

In this example, "me" is the user submitting the query; and "id" is a unique identifier associated with an object (e.g., a user or a data item). This example query requests the first 10 data items of a specific type "my_objects". As this example query illustrates, the query has a hierarchical structure. At the top level of the hierarchy is "me". At the second level nested in "me" are "id", "name", and "my_objects". At the third level nested in "my_objects" is "nodes". And so on.

In particular embodiments, at step 220, data items specified in the query may be retrieved from the groups. More specifically, the nodes that represent or contain the specified data items may be identified from the groups and the data items may be retrieved from these nodes. Specific data items may be identified in the query by their unique identifiers, their data types, or any other applicable means (e.g., data items that satisfy one or more criteria).

In particular embodiments, a data item may have a specific data type. For example, one type of data items may be "user"; another type of data items may be "message post"; a third type of data items may be "image"; and so on. This disclosure contemplates any applicable data types. In particular embodiments, new data types may be defined and added as needed (e.g., by system managers or users or third-party developers). The definitions of these data types may form a schema for the API and the graphs. The definition of a specific data type may specify how that type of data items may be queried and retrieved from the graphs. The following illustrates an example definition of a data type called "node". The definition describes the data type "node" and may be included in the schema.

```
final class NodeInterface extends InterfaceDefinition {
    public function getTypeName() {
        return 'node';
    }
    protected function fields(FieldDefiner $field_def) {
        return array(
            'id' => $field_def->string(),
            'url' => $field_def->url(),
        );
    }
    public function getDescription() {
```

```
            return 'An object which itself can be queried from the
graph.';
        }
        protected function fieldDescriptions( ) {
            return array(
                'id' => 'The unique ID representing this object. Supply
to the 'node( )' root expression to retrieve this object
directly.',
                'url' => 'The unique URL representing this object which
can be accessed via a web browser. For example, the url for a
'user' would be his or her profile page.',
            );
        }
    }
}
```

For this example data type, as defined by its definition, the name of the type is "node". The fields of the type include "id" and "url". In addition, the descriptions of the data type itself and each of its fields may also be included in the definition (e.g., as a part of the API code).

In particular embodiments, a user may invoke an appropriate API call to query a specific data type defined in the schema for information concerning that data type. For example, to query for "node", the user may submit a query such as: type(node) {name, description, fields {name, description}} The query requests the name and description of type "node" itself as well as the name and description of the fields of type "node". This query may result in the following response:

```
{
    "node": {
        "name": "node",
        "description": "An object which itself can be queried from
the graph.",
        "fields": [
            {
                "name": "id",
                "description": "The unique ID representing this object.
Supply to the 'node( )' root expression to retrieve this object
directly."
            },
            {
                "name": "url",
                "description": "The unique URL representing this
object
which can be accessed via a web browser. For example, the url
for a 'user' would be his or her profile page."
            }
        ]
    }
}
```

The response includes the name and description of the type "node" and each of its fields (i.e., "id" and "url"), as defined in the definition of "node" illustrated above. Furthermore, the response is arranged in a hierarchy structure as well, corresponding to the hierarchical structure of the query.

As this example illustrates, in particular embodiments, information describing a specific data type may be included in the definition of that data type. The description of a data type may be queried using the API, similar as querying a data item using the API. In this sense, the API is self-documenting. That is, the documentation of a data type is included in the schema as part of its definition.

In particular embodiments, there may be privacy protection associated with some or all of the data items stored in the hierarchical graphs. A data item may only be accessed by a specific list of users and not by other users. For example, when a user posts a photograph (i.e., a data item), the user may specify that the photograph can only be viewed by his social friends. In this case, other users who are not friends with this user are not authorized to access this specific photograph.

In particular embodiments, when retrieving data items in response to a query, the privacy protection associated with specific data items are taken into consideration. As an example, suppose that a first user, through a query, requests 10 messages most recently posted by a second user (e.g., a friend of the first user). When retrieving these messages for the first user in response to the query, each message posted by the second user may be analyzed to determine whether the first user is authorized to access that message. Suppose that among the 10 messages most recently posted by the second user, 3 of them can only be viewed by a third user while 7 of them can be viewed by all users including the first user (e.g., as specified by the second user). In this case, only the 7 messages are retrieved in response to the first user's query. The 3 messages that can only be viewed by the third user are not retrieved for the first user, since the first user is not authorized to view these specific messages. Instead, to make up for the 10 messages as requested by the first user's query, 3 slightly older messages posted by the second user (e.g., identified in reverse chronological order), which the first user is authorized to view, are retrieved and combined with the 7 messages. On the other hand, if it is the third user who requests the 10 messages most recently posted by the second user, all 10 newest messages may be retrieved in response to the third user's query since the third user is authorized to view all of these messages. As this example illustrates, because of privacy protection associated with data items, when two users submit the same query, they may receive different results in response.

In particular embodiments, retrieving a large number of data items may be performed in response to a series of queries. This may be helpful in terms of improving performance for certain types of user devices, such as mobile devices. As an example, suppose that a user wishes to retrieve and view 100 photos most recently posted by all of his social friends. Instead of submitting a single query for 100 photos, the user may submit a series of 10 queries, where each query requests 10 photos at a time. This way, the user may begin viewing some photos while other photos are being retrieved and sent to the user's device. In addition, the user may view some photos at one time and other photos at another time (e.g., as opposed to viewing all 100 photos together).

In particular embodiments, queries submitted by a user and their responses may be recorded. In the above example, when the user submits the first query for the 10 photo most recently posted by his friends, 10 most recent photos accessible to the users may be retrieved from the graphs and sent to the user. In addition, the 10 photos or the last one of the 10 photos sent to the user may be recorded. Then, when the user submits the second query for another 10 photos, the second 10 most recent photos, starting from after the previous 10 photos in reverse chronological order, accessible to the users may be retrieved from the graphs and sent to the user. Again, the last one of the 10 photos now sent to the user may be recorded. When the user submits the third query for yet another 10 photos, the third 10 most recent photos, starting from after the previous 10 photos in reverse chronological order, accessible to the users may be retrieved from the graphs and sent to the user. And so on. This way, the data retrieval process automatically handles pagination for the user.

At step 230, the retrieved data items may be organized according to a hierarchical format and sent to the user submitting the query. Sometimes, the nodes representing or containing the requested data items may belong to different graphs. In this case, the data items may be retrieved from appropriate nodes in appropriate graphs and arranged in a single hierarchical structure.

In particular embodiments, the hierarchical structure of the outputted data items may correspond to the hierarchical structure of the query. As illustrated in the above example where a query requests the name and description of type "node" itself followed by the name and description of the fields of type "node", the outputted data items are arranged in a hierarchical structure. At one level is the type "node". At the next level nested within "node" are the name, description, and fields of the type "node". At the further next level nested within "fields" are the name and description of each of the fields in type "node". The arrangement of the outputted data items corresponds to the arrangement of the query.

In particular embodiments, the definitions of individual data types may form one or more schemas. These definitions may be included in the API so that data items may be queried and retrieved based on their definitions. Often, there may be different versions of the API. For example, from time to time, the API may be updated from an older version to a newer version. Different versions of the API may be implemented for different platforms (e.g., mobile vs. non-mobile, different operating systems) so that each version includes code especially suitable to a corresponding platform.

Figure 3:
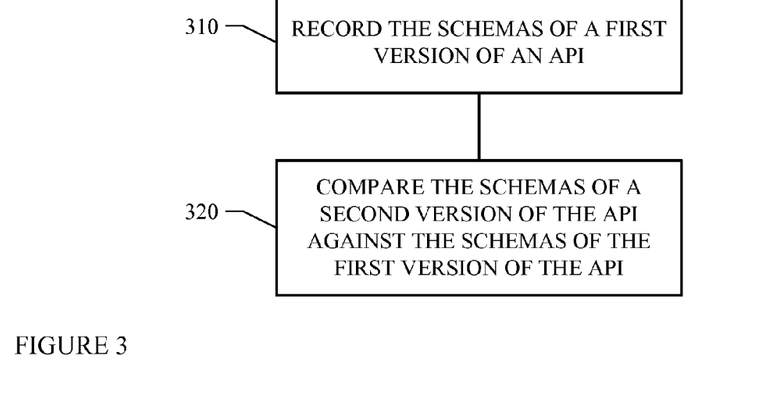
FIG. 3 illustrates an example method for validating a version of an Application Programming Interface based on schemas.

In particular embodiments, the schemas may be used to test and validate a particular version of the API. FIG. 3 illustrates an example method for validating a version of the API using schemas. Suppose that there is a first version of the API that is known to function correctly. One or more schemas may be associated with the first version of the API, and these schemas may include the definitions of all the data types available (e.g., the data types to which the data items stored in the hierarchical graphs belong). Further suppose that a second version of the API becomes available.

At step 310, the schemas associated with the first version of the API may be recorded. Then, the second version of the API may be used to retrieve data items from the groups (e.g., for testing and validation). In particular embodiments, at step 320, the schemas associated with the second version of the API may be compared against the schemas associated with the first version to ensure that, for example, all the definitions of data types in the schemas associated with the first version are also found in the schemas associated with the second version (i.e., no data type is missing from the second version), or the definition of a specific data type found in the schemas associated with the second version is the same as that found in the schemas associated with the first version, or using the second version of the API to retrieve data items in response to a specific query produces the same result as using the first version (i.e., using a query expressed according to the schemas associated with the first version and a query expressed according to the schemas associated with the second version for the same data items produce the same result).

If the second version of the API functions correctly based on the schemas, then the second version may be released. Otherwise, the errors in the second version (e.g., missing data type definitions or incorrect data type definitions) need to be corrected first before it can be released.

As described earlier, data item stored in the hierarchical graphs may have various data types. Ordinarily, an application (or a programmer writing the application's codes) may need definition of a particular data type prior to querying and retrieving from a database (e.g., a hierarchical graph) data items of the particular type (or validating a retrieved data item's data type). Particular embodiments may retrieve data items from hierarchical graphs based on introspection queries. Particular embodiments may submit an introspection query to the API of the graphs to retrieve a data structure of a specific data type. Particular embodiments may then submit to the API a data query for data items of the specific data type based on the data structure retrieved by the introspection query. Particular embodiments may also validate a response to the data query by comparing the response's data structure to the retrieved data structure.

Figure 4:
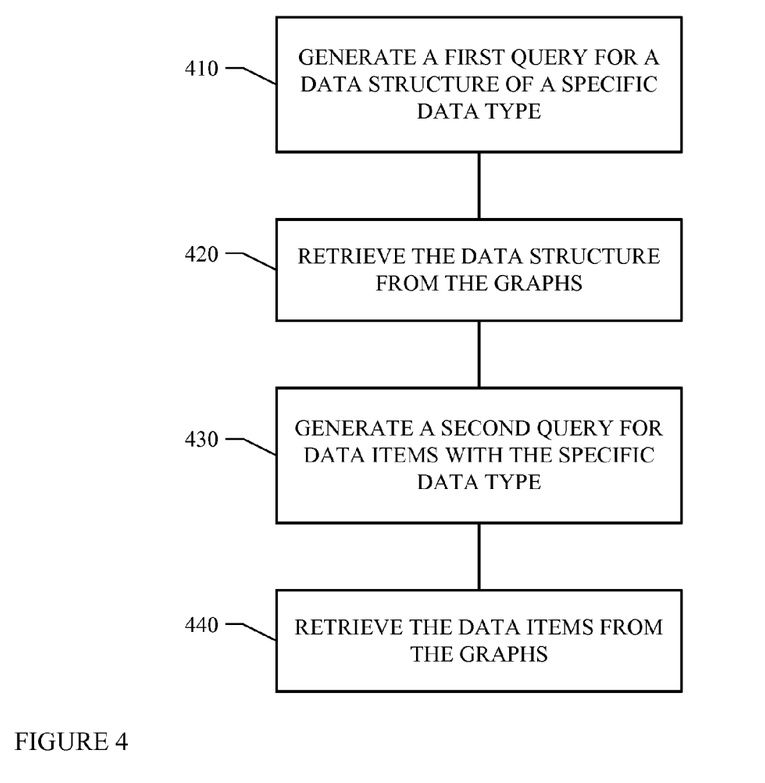
FIG. 4 illustrates an example method for retrieving data items from hierarchical graphs based on introspection queries.

FIG. 4 illustrates an example method for retrieving data items from hierarchical graphs based on introspection queries. In particular embodiments, the method illustrated in FIG. 4 may start at step 410, where an application may send a first query (an introspection query) that requests a data structure of a specific data type. In particular embodiments, at step 420, the application may retrieve the data structure of the specific data type from the graphs. For example, the introspection query may be sent by an application hosted by a user's client device to one or more computing systems (e.g., servers) managing the graphs over appropriate computer or communication connections (e.g., wireless or wireline connections). In particular embodiments, an appropriate API call may be invoked by the application to send the introspection query to the server and retrieve the results from the server. In particular embodiments, a query requesting a data structure of a specific data type may be expressed in a language having a hierarchical structure. Furthermore, in particular embodiments, the language may have a predefined syntax. The following illustrates an example introspection query:

type (my_objects) {name, type {fields {name, fields}}}

The query requests (as indicated by the prefix "type") the name and fields of a data type "my_objects". The query also requests the names and fields of one or more child data structures, if any, of the fields of the data type "my_objects". The retrieved data structure (i.e., response to the introspection query) may be expressed in JavaScript Object Notation (JSON) format. For example, the query may result in the following response:

```
{
    "my_objects": {
        "name": "my_objects",
        "fields": [
            {
                "name": "id",
                "name": "comment_count",
                "actors": {
                    "name": "actors",
                    "field": [
                        {
                            "name": "id",
                            "name": "friends"
                        }
                    ]
                }
            }
        ]
    }
}
```

The response includes the name of the data type "my_objects" and the names of each of its fields (i.e., "id", "comment_count", and "actors"). The response also includes the names of each of the fields of the field "actors" (i.e., "id" and "friends"). That is, the data type "my_objects" has a hierarchical data structure comprising "name", "id", "comment_count", and "actors" at the top level, while "id" and "friends" are nested in "actors" at the second level.

In particular embodiments, at step 430, the application may generate a second query (a data query) that requests one or more specific data items having the specific data type. In particular embodiments, the data query may be expressed in a format corresponding to the retrieved data structure of the specified data type. The following illustrates an example data query:

```
me( ) {
    id,
    my_objects.first(3) {
        id,
        comment_count,
        actors{id, friends}
    }
}
```

In the example, the application may submit the query based on a request from a user "me" with a unique identifier "id". The query above requests the first 3 data items of the specific data type "my_objects". The query is expressed in a hierarchical format corresponding to the retrieved data structure of the specified data type "my_objects": the query requests results in "id", "comment_count", and "actors" at the top level, and results in "id" and "friends" nested in "actors" at the second level.

In some embodiments, the application may generate a second query (a data query) with some but not all the fields in the retrieved data structure of the specified data type "my_objects". The following illustrates another example data query:

```
me( ) {
    id,
    my_objects.first(3) {
        id,
        actors{id, friends}
    }
}
```

The query requests results in "id" and "actors" at the top level, and results in "id" and "friends" nested in "actors" at the second level. The field "comment_count" at the top level of the retrieved data structure of the specified data type "my_objects" is omitted in the query. In particular embodiments, at step 440, the application may retrieve the specific data items from the graph. The retrieved data items may be expressed in JSON format. For example, the query may result in the following response:

```
{
    {
        "id": "0123",
        "actors":
        {
            "id": "012345",
            "friends": "John, Mary, Bob"
        }
    }
    {
        "id": "2345",
        "actors":
        {
            "id": "254069",
            "profile_pic_img": "https://www.example.com/9876.jpg"
        }
    }
    {
        "id": "6789",
        "actors":
        {
            "id": "502839",
```

-continued

```
            "friends": "Susan, Charlie, Liza, Katie, Brandon"
        }
    }
}
```

The response includes 3 results with "id" being "0123", "2345", and "6789", respectively.

As the data query completely describes the data structure of a response, particular embodiments may validate a response against the data query's data structure (which is based on the retrieved data structure of the specific data type). In particular embodiments, the application may validate the retrieved data items based on the retrieved data structure of the specific data type. The application may compare the retrieved data items against the retrieved data structure of the specific data type by inspecting the retrieved data items with a recursive parsing algorithm. For example, the application may determine that the results above with "id" of "0123" and "6789" have a data structure consistent with the retrieved data structure: "id" and "actors" being at the top level, while "id" and "friends" being nested in "actors" at the second level. The application may determine that the result above with "id" of "2345" does not have a data structure consistent with the retrieved data structure. The result with "id" of "2345" has "id" and "actors" at the top level of its data structure, however, it has "id" and "profile_pic_img" nested in "actors" at the second level of its data structure. Since the result with "id" of "2345" may be an erroneous result as having an unexpected data structure, the application may discard the result with "id" of "2345". The application may also submit another data query to the API to retrieve from the graphs one or more data items of the specific data type.

Particular embodiments may repeat the steps of the method of FIG. 4, where appropriate. Moreover, although this disclosure describes and illustrates particular steps of the method of FIG. 4 as occurring in a particular order, this disclosure contemplates any suitable steps of the method of FIG. 4 occurring in any suitable order. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
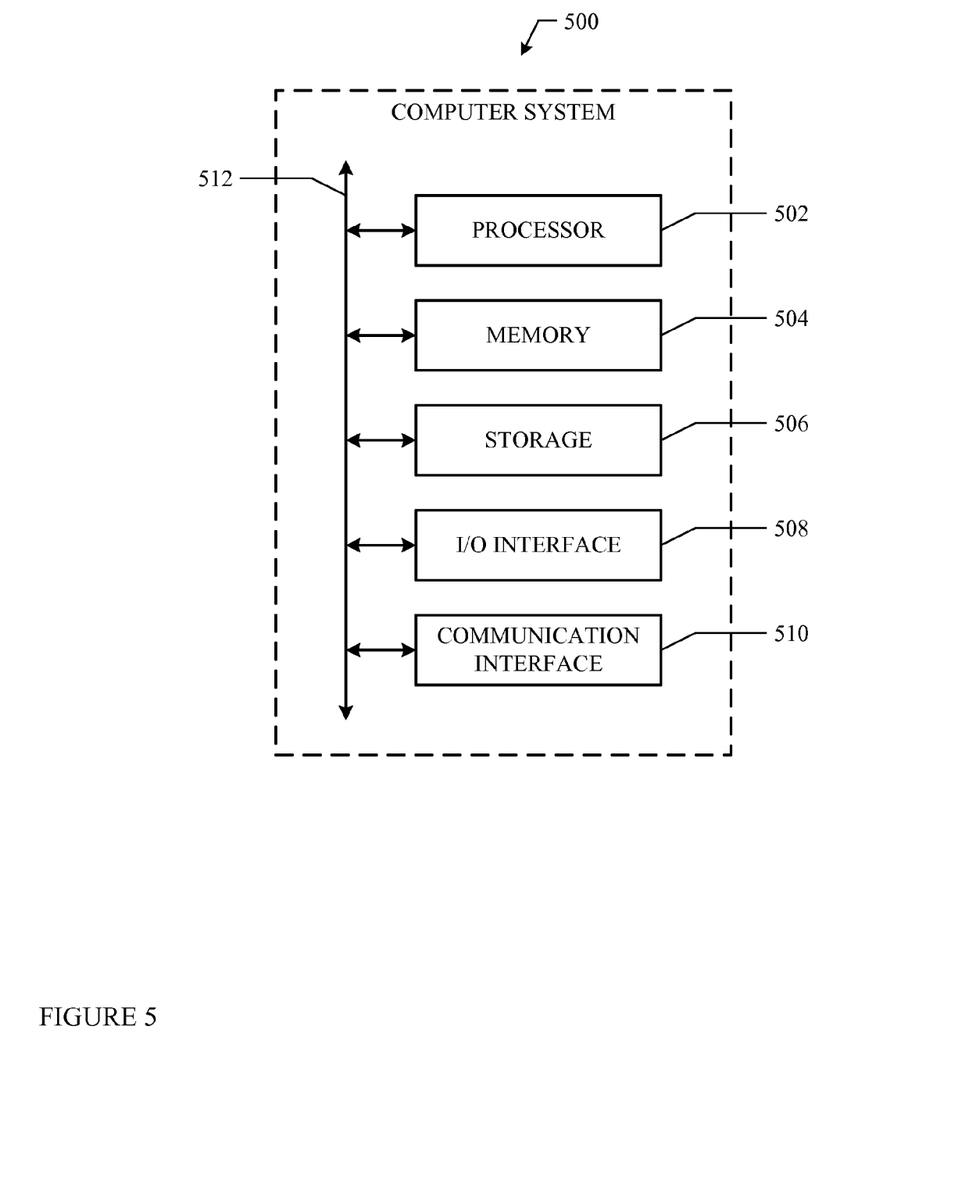
FIG. 5 illustrates an example computer system.

Particular embodiments may be implemented on one or more computer systems. FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 500 may include one or more computer systems 500; be unitary or distributed; span multiple locations; span multiple machines; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include an HDD, a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, reference to a computer-readable non-transitory storage medium may include a semiconductor-based or other integrated circuit (IC) (such, as for example, a field-programmable gate array (FPGA) or an application-specific IC (ASIC)), a hard disk drive ("HDD"), a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable non-transitory storage medium or a suitable combination of these, where appropriate. This disclosure contemplates one or more computer-readable storage media implementing any suitable storage. In particular embodiments, a computer-readable storage medium implements one or more portions of processor 502 (such as, for example, one or more internal registers or caches), one or more portions of memory 504, one or more portions of storage 506, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method comprising:
   storing one or more first query schemas associated with a first version of an Application Programming Interface (API), the first version of the API being used for retrieving data items stored in one or more hierarchical graphs, wherein the first query schemas comprise a first set of one or more definitions of one or more data types to which the data items belong;
   forming one or more second query schemas associated with a second version of the API, wherein the second query schemas comprise a second set of the definitions; and
   validating the second version of the API by comparing the second query schemas with the first query schemas to determine whether the second set of the definitions is the same as the first set of the definitions; and
   in response to determining that the second set of the definitions is the same as the first set of the definitions, providing the second version of the API for use in retrieving the data items stored in the one or more hierarchical graphs.

2. The computer-implemented method of claim 1, wherein comparing the second query schemas with the first query schemas further comprises determining whether all definitions of data types available in the first query schemas are also available in the second query schemas.

3. The computer-implemented method of claim 1, wherein for each of one or more first data types in the first query schemas, the definition of the first-data type comprises an identifier and a description of the first data type.

4. The computer-implemented method of claim 3, further comprising:
   receiving a query for a specific first data type; and
   outputting the identifier and the description of the specific first data type according to the definition of the specific first data type in the first query schemas in response to the query.

5. The computer-implemented method of claim 1, further comprising:
   in response to determining that the second set of the definitions is not the same as the first set of the definitions, identifying errors in the second version of the API.

6. One or more computer-readable non-transitory storage media embodying software that is operable when executed to:
   store one or more first query schemas associated with a first version of an Application Programming Interface (API), the first version of the API being used for retrieving data items stored in one or more hierarchical graphs, wherein the first query schemas comprise a first set of one or more definitions of one or more data types to which the data items belong;
   form one or more second query schemas associated with a second version of the API, wherein the second query schemas comprise a second set of the definitions; and
   validate the second version of the API by comparing the second query schemas with the first query schemas to determine whether the second set of the definitions is the same as the first set of the definitions;
   in response to determining that the second set of the definitions is the same as the first set of the definitions, provide the second version of the API for use in retrieving the data items stored in the one or more hierarchical graphs.

7. The media of claim 6, wherein the software operable when executed to compare the one or more second query schemas with the one or more first query schemas further comprises software operable when executed to: determine whether all definitions of data types available in the first query schemas are also available in the second schemas.

8. The media of claim 6, wherein for each of one or more first data types in the first query schemas, the definition of the first data type comprises an identifier and a description of the first data type.

9. The media of claim 8, wherein the software is further operable when executed to:
   receive a query for a specific first data type; and
   output the identifier and the description of the specific first data type according to the definition of the specific first data type in the first query schemas in response to the query.

10. The media of claim 6, wherein the software is further operable when executed to:
    in response to determining that the second set of the definitions is not the same as the first set of the definitions, identify errors in the second version of the API.

11. A system comprising:
    one or more processors; and
    a memory coupled to the processors comprising instructions executable by the processors, the processors operable when executing the instructions to:
    store one or more first query schemas associated with a first version of an Application Programming Interface (API), the first version of the API being used for retrieving data items stored in one or more hierarchical graphs, wherein the first query schemas comprise a first set of one or more definitions of one or more data types to which the data items belong;
    form one or more second query schemas associated with a second version of the API, wherein the second query schemas comprise a second set of the definitions; and
    validate the second version of the API by comparing the second query schemas with the first query schemas to determine whether the second set of the definitions is the same as the first set of the definitions; and
    in response to determining that the second set of the definitions is the same as the first set of the definitions, provide the second version of the API for use in retrieving the data items stored in the one or more hierarchical graphs.

12. The system of claim 11, wherein the processors being operable when executing the instructions to compare the second query schemas with the first query schemas further comprises the processors being operable to:
    determine whether all definitions of data types available in the first query schemas are also available in the second schemas.

13. The system of claim 11, wherein for each of one or more first data types in the first query schemas, the definition of the first data type comprises an identifier and a description of the first data type.

14. The system of claim 13, wherein the processors are further operable when executing the instructions to:
receive a query for a specific first data type; and
output the identifier and the description of the specific first data type according to the definition of the specific first data type in the first query schemas in response to the query.

15. The system of claim 11, wherein the processors are further operable when executing the instructions to:
in response to determining that the second set of the definitions is not the same as the first set of the definitions, identify errors in the second version of the API.

* * * * *